US012079968B2

(12) United States Patent
Han

(10) Patent No.: US 12,079,968 B2
(45) Date of Patent: Sep. 3, 2024

(54) APPARATUS AND METHOD FOR NOISE REDUCTION FROM A MULTI-VIEW IMAGE

(71) Applicant: SK hynix Inc., Gyeonggi-do (KR)

(72) Inventor: Ji Hee Han, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 400 days.

(21) Appl. No.: 17/669,732

(22) Filed: Feb. 11, 2022

(65) Prior Publication Data

US 2022/0405890 A1    Dec. 22, 2022

(30) Foreign Application Priority Data

Jun. 22, 2021   (KR) .................. 10-2021-0080682

(51) Int. Cl.
| | | |
|---|---|---|
| *G06T 5/73* | (2024.01) | |
| *G06T 3/40* | (2006.01) | |
| *G06T 7/12* | (2017.01) | |
| *G06T 7/70* | (2017.01) | |

(Continued)

(52) U.S. Cl.
CPC .................. *G06T 5/73* (2024.01); *G06T 3/40* (2013.01); *G06T 7/12* (2017.01); *G06T 7/70* (2017.01); *H04N 13/156* (2018.05); *H04N 13/282* (2018.05); *G06T 2200/04* (2013.01); *G06T 2207/10012* (2013.01); *G06T 2207/20021* (2013.01); *G06T 2207/20212* (2013.01)

(58) Field of Classification Search
CPC .... G06T 5/73; G06T 7/12; G06T 7/70; G06T 3/40; G06T 2200/04; G06T 2207/10012; G06T 2207/20021; G06T 2207/20212; H04N 13/156; H04N 13/282

USPC ........................................................... 348/46
See application file for complete search history.

(56) References Cited

U.S. PATENT DOCUMENTS

| | | |
|---|---|---|
| 8,659,597 B2 | 2/2014 | Johnsson et al. |
| 9,529,427 B2 | 12/2016 | Raghoebardayal et al. |
| 10,388,025 B2 | 8/2019 | Mollis |

(Continued)

FOREIGN PATENT DOCUMENTS

| | | |
|---|---|---|
| CN | 1888814 A | 1/2007 |
| CN | 101271582 A | 9/2008 |

(Continued)

OTHER PUBLICATIONS

Office Action for the Chinese Patent Application No. 202210260493.7 issued by the Chinese Patent Office on May 31, 2023.

*Primary Examiner* — Sath V Perungavoor
*Assistant Examiner* — Kristin Dobbs
(74) *Attorney, Agent, or Firm* — IP & T GROUP LLP

(57) ABSTRACT

An image processing apparatus is coupled to a plurality of image capturing devices. The image processing apparatus reduces a noise in an epi-polar image while generating a three-dimensional image from a multi view image. The image processing apparatus divides the multi view image into a flat region and a non-flat region, generates the epi-polar image from the multi view image, replaces an epi-polar line in the epi-polar image corresponding to the flat region with an average pixel value of the multi-view image, and replaces an epi-polar line in the epi-polar image corresponding to the non-flat region with a pixel value of a center-view image obtained from a centrally located image capturing device among the plurality of image capturing devices.

21 Claims, 11 Drawing Sheets

(51) Int. Cl.
  *H04N 13/156*  (2018.01)
  *H04N 13/282*  (2018.01)

(56)  References Cited

U.S. PATENT DOCUMENTS

| | | |
|---|---|---|
| 2016/0345001 A1 | 11/2016 | Baek et al. |
| 2017/0111633 A1 | 4/2017 | Kang et al. |
| 2018/0278955 A1 | 9/2018 | Thoreau et al. |
| 2019/0236796 A1* | 8/2019 | Blasco Claret ........... G06T 5/70 |
| 2019/0364265 A1* | 11/2019 | Matsunobu .......... H04N 13/194 |
| 2020/0134849 A1 | 4/2020 | Blasco Claret et al. |
| 2021/0019937 A1 | 1/2021 | Gallaway et al. |
| 2022/0327851 A1* | 10/2022 | Flagg ................. G06V 20/653 |

FOREIGN PATENT DOCUMENTS

| | | |
|---|---|---|
| CN | 102930530 A | 2/2013 |
| CN | 103685922 A | 3/2014 |
| CN | 103776392 A | 5/2014 |
| CN | 105205796 A | 12/2015 |
| CN | 106228605 A | 12/2016 |
| CN | 110036410 A | 7/2019 |
| CN | 115514877 B | 3/2024 |
| EP | 2713202 A2 | 4/2014 |
| JP | 2017201431 A | 11/2017 |

\* cited by examiner

APPARATUS AND METHOD FOR NOISE REDUCTION FROM A MULTI-VIEW IMAGE

CROSS-REFERENCE TO RELATED APPLICATIONS

This patent application claims the benefit of Korean Patent Application No. 10-2021-0080682, filed on Jun. 22, 2021, the entire disclosure of which is incorporated herein by reference.

TECHNICAL FIELD

One or more embodiments of the present disclosure described herein relate to an image processing technique, and more particularly, to an apparatus and a method for reducing a noise in a multi-view image.

BACKGROUND

An image sensor is a device that captures an image by using a property of a semiconductor that responds to light. The image sensor can be divided into two types: a charge coupled device (CCD) and a complementary metal oxide semiconductor (CMOS). The image sensor using the CMOS has been widely used due to an advantage that analog and digital control circuits can be directly implemented on a single integrated circuit (IC). Although the image sensor can generate a two-dimensional (2D) image, various technologies have been suggested for generating a three-dimensional (3D) image using plural image sensors.

Capturing pinhole images with large depth of field (depth of focus) might be important in various computer vision applications such as 3D image reconstruction, motion analysis and video surveillance. Because capturing a pinhole image is more difficult in a dynamic scene, a compromise between depth of field and motion blur could be used. For example, if a large aperture and a short exposure are used to avoid a motion blur, the resulting image would have a small depth of field. Conversely, using a small aperture and a long exposure increases the depth of field but induces a motion blur. To overcome this issue, a pinhole image can be obtained using a plurality of pinhole cameras. Cameras can be spatially distributed or assembled in an array form to monitor a general scene. Each camera may use a small aperture and a short exposure to minimize optical defocus and motion blur. However, in such a camera setting, the incoming light could be very weak, and a lot of noise may occur in the image. Multi-view images may be used for noise reduction.

BRIEF DESCRIPTION OF THE DRAWINGS

The description herein makes reference to the accompanying drawings wherein like reference numerals refer to like parts throughout the figures.

DETAILED DESCRIPTION

Figure 1:
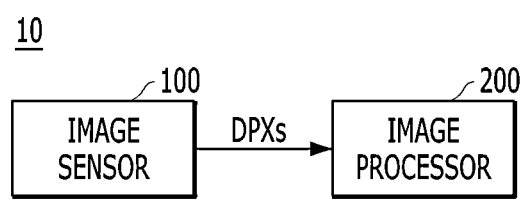
FIG. 1 illustrates an image processing apparatus according to an embodiment of the present disclosure according to an embodiment of the present disclosure.

Various embodiments of the present disclosure are described below with reference to the accompanying drawings. Elements and features of this disclosure, however, may be configured or arranged differently to form other embodiments, which may be variations of any of the disclosed embodiments.

In this disclosure, references to various features (e.g., elements, structures, modules, components, steps, operations, characteristics, etc.) included in "one embodiment," "example embodiment," "an embodiment," "another embodiment," "some embodiments," "various embodiments," "other embodiments," "alternative embodiment," and the like are intended to mean that any such features are included in one or more embodiments of the present disclosure, but may or may not necessarily be combined in the same embodiments.

In this disclosure, the terms "comprise," "comprising," "include," and "including" are open-ended. As used in the appended claims, these terms specify the presence of the stated elements and do not preclude the presence or addition of one or more other elements. The terms in a claim do not foreclose the apparatus from including additional components e.g., an interface unit, circuitry, etc.

In this disclosure, various units, circuits, or other components may be described or claimed as "configured to" perform a task or tasks. In such contexts, "configured to" is used to connote structure by indicating that the blocks/units/ circuits/components include structure (e.g., circuitry) that performs one or more tasks during operation. As such, the block/unit/circuit/component can be said to be configured to perform the task even when the specified block/unit/circuit/component is not currently operational e.g., is not turned on nor activated. The block/unit/circuit/component used with the "configured to" language include hardware for example, circuits, memory storing program instructions executable to implement the operation, etc. Additionally, "configured to" can include a generic structure e.g., generic circuitry, that is manipulated by software and/or firmware e.g., an FPGA or a general-purpose processor executing software to operate in manner that is capable of performing the task(s) at issue. "Configured to" may also include adapting a manufacturing process e.g., a semiconductor fabrication facility, to fabricate devices e.g., integrated circuits that are adapted to implement or perform one or more tasks.

As used in this disclosure, the term 'circuitry' or 'logic' refers to all of the following: (a) hardware-only circuit implementations such as implementations in only analog and/or digital circuitry and (b) combinations of circuits and software and/or firmware, such as (as applicable): (i) to a combination of processor(s) or (ii) to portions of processor(s)/software including digital signal processor(s), software, and memory(ies) that work together to cause an apparatus, such as a mobile phone or server, to perform various functions and (c) circuits, such as a microprocessor(s) or a portion of a microprocessor(s), that require software or firmware for operation, even if the software or firmware is not physically present. This definition of 'circuitry' or 'logic' applies to all uses of this term in this application, including in any claims. As a further example, as used in this application, the term "circuitry" or "logic" also covers an implementation of merely a processor or multiple processors or portion of a processor and its (or their) accompanying software and/or firmware. The term "circuitry" or "logic" also covers, for example, and if applicable to a particular claim element, an integrated circuit for a storage device.

As used herein, the terms "first," "second," "third," and so on are used as labels for nouns that they precede, and do not imply any type of ordering e.g., spatial, temporal, logical, etc. The terms "first" and "second" do not necessarily imply that the first value must be written before the second value. Further, although the terms may be used herein to identify various elements, these elements are not limited by these terms. These terms are used to distinguish one element from another element that otherwise have the same or similar names. For example, a first circuitry may be distinguished from a second circuitry.

Further, the term "based on" is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

Embodiments described herein can provide an apparatus and a method for performing noise reduction in a multi-view image. The multi-view image can be obtained by synthesizing n viewpoint images, where 'n' is an integer greater than 1. For example, the multi-view image can be considered a synthesized version of plural images.

In an embodiment of the present disclosure, an apparatus and a method can use an adaptive weight to reduce a noise while securing a three-dimensional (3D) image based on a multi-view image. Particularly, an average value of the multi-view image can be used in a flat region of the multi-view image, and a center-view image value can be used in a non-flat region or an edge region of the multi-view image. Based on this way, the apparatus and the method capable of improving efficiency of generating and utilizing the 3D image can reduce an amount of calculation or computation for noise reduction.

An embodiment of the present disclosure can estimate a depth of a subject based on an epi-polar image obtained from the multi-view image. Thus, the embodiment can be applicable to various computer vision applications for reconstruction of a 3D image, motion analysis, and surveillance video.

In an embodiment, an image processing apparatus can be coupled to a plurality of image capturing devices. The image processing apparatus can reduce a noise in an epi-polar image while generating a three-dimensional image from a multi-view image. The image processing apparatus can be configured to: divide the multi-view image into a flat region and a non-flat region; generate the epi-polar image from the multi-view image; replace an epi-polar line in the epi-polar image corresponding to the flat region with an average pixel value of the multi-view image; and replace an epi-polar line in the epi-polar image corresponding to the non-flat region with a pixel value of a center-view image obtained from a centrally located image capturing device among the plurality of image capturing devices.

The flat region and the non-flat region can be divided based on a standard deviation of an image selected from the multi-view image, and the non-flat region includes an edge region and an uneven region.

The image processing apparatus can be configured to: apply a gain and an offset to the standard deviation to generate a scaled standard deviation; generate an adaptive weight based on the scaled standard deviation; and apply the adaptive weight to the flat region and the non-flat region in different ways.

The adaptive weight can tend to decrease as the scaled standard deviation increases.

The epi-polar image can be generated by stacking pixel data corresponding to a same row of the multi-view image.

The image processing apparatus can be configured to determine a search window between a first epi-polar line corresponding to the farthest object in the epi-polar image and a second epi-polar line corresponding to the closest object in the epi-polar image, or between a vertical reference line set by the first epi-polar line corresponding to the farthest object in the epi-polar image and another epi-polar line having a maximum slope in the epi-polar image.

The image processing apparatus can be configured to extract a location of pixel having the least difference of intensity among plural pixels included in the search window.

The image processing apparatus can be configured to estimate a new line using a RANdom SAmple Consensus (RANSAC) algorithm based on the location of the pixel and change the location of the pixel with a location of pixel on the new line.

The image processing apparatus can be configured to calculate an average value from a pixel value at the location of pixel on the new line and apply an adaptive weight to the average value to reduce the noise.

The 3D image can have a noise reduction result including: a first product of an adaptive weight and the average pixel value, the first product used for the flat region of the multi-view image; and a second product of a value obtained by subtracting the adaptive weight from 1 and the pixel value of the center-view image, the second product used for the non-flat region of the multi-view image.

In another embodiment, a method for reducing noise while generating a three-dimensional image from a multi-view image can include receiving the multi-view image from a plurality of image capturing devices; dividing a center-view image of the multi-view image into a flat region and a non-flat region; generating an epi-polar image from the multi view image; replacing an epi-polar line in the epi-polar image corresponding to the flat region with an average pixel value of the multi-view image; and replacing an epi-polar line in the epi-polar image corresponding to the non-flat region with a pixel value of the center-view image obtained from a centrally located image capturing device among the plurality of image capturing devices.

The flat region and the non-flat region can be divided based on a standard deviation of the multi-view image, and the non-flat region includes an edge region and an uneven region.

The method can further include applying a gain and an offset to the standard deviation to generate a scaled standard deviation; generating an adaptive weight based on the scaled standard deviation; and applying the adaptive weight to the flat region and the non-flat region in different ways.

The adaptive weight can tend to decrease as the scaled standard deviation increases.

The epi-polar image can be generated by stacking pixel data corresponding to a same row of the multi-view image.

The method can further include determining a search window between a first epi-polar line corresponding to the farthest object in the epi-polar image and a second epi-polar line corresponding to the closest object in the epi-polar image, or between a vertical reference line set by the first epi-polar line corresponding to the farthest object in the epi-polar image and another epi-polar line having a maximum slope in the epi-polar image.

The method can further include extracting a location of a pixel having the least difference of intensity among plural pixels included in the search window.

The method can further include estimating a new line using a RANdom SAmple Consensus (RANSAC) algorithm based on the location of the pixel and change the location of the pixel with a location of pixel on the new line.

The method can further include calculating an average value from a pixel value at the location of pixel on the new line and apply an adaptive weight to the average value to reduce the noise.

The 3D image can have a noise reduction result including: a first product of an adaptive weight and the average pixel value, the first product used for the flat region of the multi-view image; and a second product of a value obtained by subtracting the adaptive weight from 1 and the pixel value of the center-view image, the second product used for the non-flat region of the multi-view image.

In another embodiment, an image processing method can include generating a multi-view image configured by a group of 2-dimensional (2D) images captured at respective three-dimensional (3D) locations different from each other, the 2D images being of the same object captured at the same time; generating an adaptive weight based on a statistical pixel value of a center-view image among the 2D images; generating an epi-polar image from the multi-view image; identifying a first epi-polar line within the epi-polar image; inferring a second epi-polar line within the center-view image based on the first epi-polar line; generating a 3D noise reduction value based on the second epi-polar line; and generating a noise-reduced replaceable value based on the center-view image, the first epi-polar line, the 3D noise reduction value and the adaptive weight.

Embodiments will now be described with reference to the accompanying drawings, wherein like numbers reference like elements.

FIG. 1 illustrates an image processing apparatus according to an embodiment of the present disclosure.

Referring to FIG. 1, an image processing apparatus 10 can include an image sensor 100 and an image processor 200 coupled to the image sensor 100.

According to an embodiment, the image sensor 100 can generate a plurality of pixel values DPXs corresponding to a captured image. For example, the image sensor 100 can generate the plurality of pixel values DPXs corresponding to a single frame.

According to an embodiment, the image sensor 100 may include a plurality of camera devices or image capturing devices. The plurality of camera devices can be disposed on the same horizontal line to generate a multi-view image. In another embodiment, the image sensor 100 can include a plurality of micro lenses over a single image sensor. The plurality of micro lenses can be arranged in a row, column, or matrix form to generate a multi-view image.

The image processor 200 can secure a three-dimensional (3D) image from the multi-view image. For example, a method for producing 3D media files includes converting existing 2D images and videos to 3D. The 2D to 3D conversion methods that estimate the depth map from 2D scenes for 3D reconstruction present an efficient approach to save on the cost of the coding, transmission and storage of 3D visual media in practical applications. Various 2D to 3D conversion methods based on depth maps have been developed using existing image and video processing techniques. The depth maps can be estimated either from a single 2D view or from multiple 2D views. Moreover, 3D reconstruction from multiple images is the creation of three-dimensional models from a set of images, which is the reverse process of obtaining 2D images from 3D scenes. The image processor 200 can apply an adaptive weight to reduce a noise in the 3D image. For example, in a flat region of the multi-view image, an average value of the multi-view image can be used, and a pixel value of the center-view image in the multi-view image can be used in a non-flat region or an edge region of the multi-view image. Through this method, the image processor 200 can reduce an amount of calculation or computation performed for noise reduction, thereby supporting faster 3D image generation.

Figure 2:
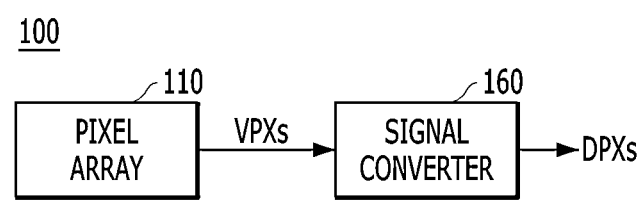
FIG. 2 illustrates an image sensor described in FIG. 1 according to an embodiment of the present disclosure.

FIG. 2 illustrates an image sensor described in FIG. 1 according to an embodiment of the present disclosure.

Referring to FIG. 2, the image sensor 100 can include a pixel array 110 and a signal converter 160.

Figure 4:
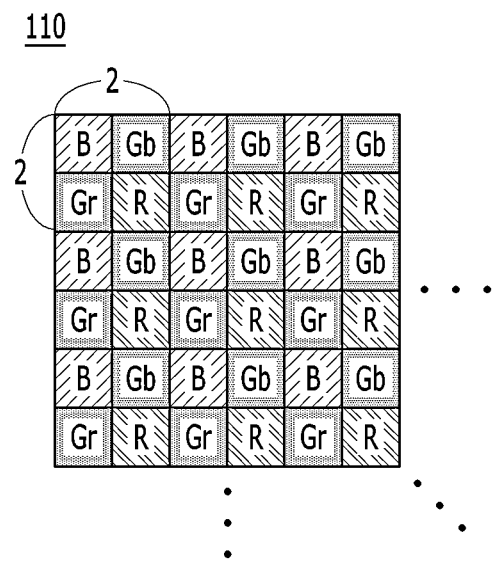
FIG. 4 illustrates a pixel array described in FIGS. 2 to 3 according to an embodiment of the present disclosure.

The pixel array 110 can include a plurality of pixels arranged in a row direction and a column direction (refer to FIG. 4). The pixel array 110 can generate a plurality of pixel signals VPXs for each row. For example, the pixel array 100 can generate a plurality of pixel signals VPXs from plural pixels arranged in a first row during a first row time, and generate a plurality of pixel signals VPXs from plural other pixels arranged in an nth row during an nth row time, where 'n' is an integer greater than 2. Each of the plurality of pixel signals VPXs may be an analog signal corresponding to incident light.

The signal converter 160 can convert the plurality of analog-type pixel signals VPXs into a plurality of digital-type pixel values DPXs. According to an embodiment, the plurality of digital-type pixel values DPXs can be output corresponding to a Bayer pattern described later. For example, the signal converter 160 can include an analog-to-digital conversion circuit 140 described with reference to FIG. 3.

Figure 3:
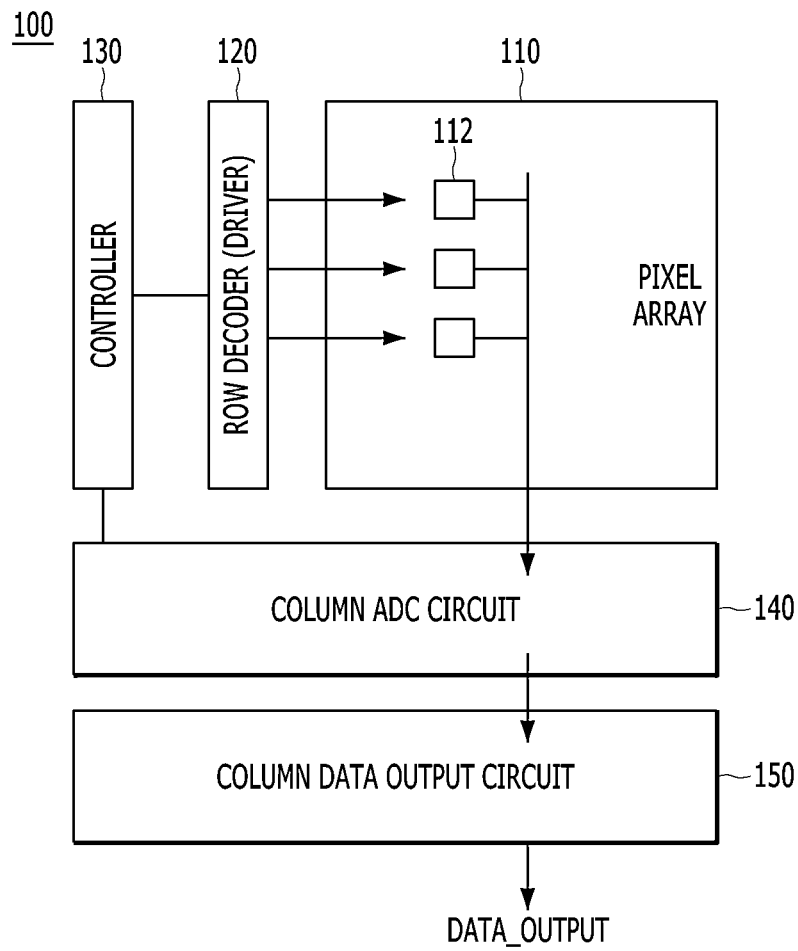
FIG. 3 illustrates a configuration of the image sensor described in FIGS. 1 and 2 according to an embodiment of the present disclosure.

FIG. 3 illustrates a configuration of the image sensor described in FIGS. 1 and 2 according to an embodiment of the present disclosure. The image sensor 100 described in FIG. 1 can be a CMOS image sensor which is widely applicable to a device in various fields such as mobile phones, surveillance security, autonomous driving, machine vision, and the Internet of Things.

Referring to FIG. 3, the image sensor 100 can include a pixel array 110, a row decoder 120, a controller 130, an analog-to-digital conversion circuit 140, and a data output circuit 150. According to an embodiment, the image sensor 100 can further include an additional module or circuit configured to process data to generate an image.

The pixel array 110 can include a plurality of pixels 112. In the pixel array 110, the plurality of pixels 112 are arranged in horizontal and vertical directions of a plane. Each of the plurality of the pixels 112 can include one photodiode and four transistors. According to an embodiment, each of the plurality of the pixels 112 can include one photodiode and three transistors. Further, in another embodiment, each of the plurality of the pixels can include a plurality of photodiodes.

The row decoder or row driver 120 can drive the plurality of pixels 112 included in the pixel array 110 in a row unit. When the row decoder 120 drives the plurality of pixels 112 in a row unit, plural pixels 112 can transmit signals, e.g., pixel data to the analog-to-digital conversion circuit 140 through wirings disposed in each column COLUMN. The row decoder 120 can be controlled by the controller 130.

The controller 130 can involve overall operations performed in the image sensor 100. The controller 130 can control the row decoder 120, the analog-to-digital conversion circuit 140, and the data output circuit 150.

Signals or information output by the pixels 112 driven by the row decoder 120 are a type of analog signal. The analog-to-digital conversion circuit 140 can convert the signals or information output from the pixels 112 into digital signals or information. The digital signals or information converted by the analog-to-digital conversion circuit 140 can be temporarily stored in the data output circuit 150. The output data DATA_OUTPUT can be transferred to another device, e.g., a circuit, a module, and the like for an image processing, by the controller 130.

The analog-to-digital conversion circuit 140 included in the image sensor 100 can have a signal reading structure, e.g., a column-parallel structure, in which units or modules operating in a column unit are arranged in parallel. The analog-to-digital conversion circuit 140 having this structure can effectively reduce a noise and increase a bandwidth in a process of reading data output from the pixel array 110. Through this, the analog-to-digital conversion circuit 140 can read data output from the pixel array 110 to support outputting the read data at a very high speed while reducing signal quality degradation.

As a resolution of the image sensor 100 increases, a size, e.g., a plane or a pitch of the pixel 112 included in the pixel array 110 decreases. As the image sensor 100 supports a higher frame rate, the time it takes for the pixel 112 included in the pixel array 110 to receive and convert incident light into electric charges could become shorter. In addition, as the image sensor 100 is mounted on a small device such as a portable terminal and a camera, there is a limitation in the size of the image sensor 100. For these reasons, the analog-to-digital conversion circuit 140 could be disposed in each column with a narrow interval. An amplitude of a signal or information output from the pixel array 110 might be reduced. The analog-to-digital conversion circuit 140 could be designed to be operable under very strict constraints.

FIG. 4 illustrates a pixel array described in FIGS. 2 to 3 according to an embodiment of the present disclosure.

Referring to FIG. 4, plural pixels of the pixel array 110 can be arranged in a predetermined pattern. For example, the plural pixels of the pixel array 120 can be arranged in the Bayer pattern. The Bayer pattern consists of repeated cell groups, each cell group having 2×2 pixels. In each cell group, two pixels (Gb, Gr) having a green color filter can be arranged to face each other diagonally, and one pixel (B) having a blue color filter and one pixel (R) having a red color filter can be disposed in the remaining corners. The four pixels B, Gb, Gr, R might not be limited to the arrangement shown in FIG. 3. According to an embodiment, the four pixels B, Gb, Gr, R can be arranged in various ways on the premise of the Bayer pattern described above. The Bayer pattern is described as an example for an embodiment of the present disclosure. The embodiment of the present disclosure is not limited thereto, and various patterns such as a quad pattern could be applicable.

Figure 5:
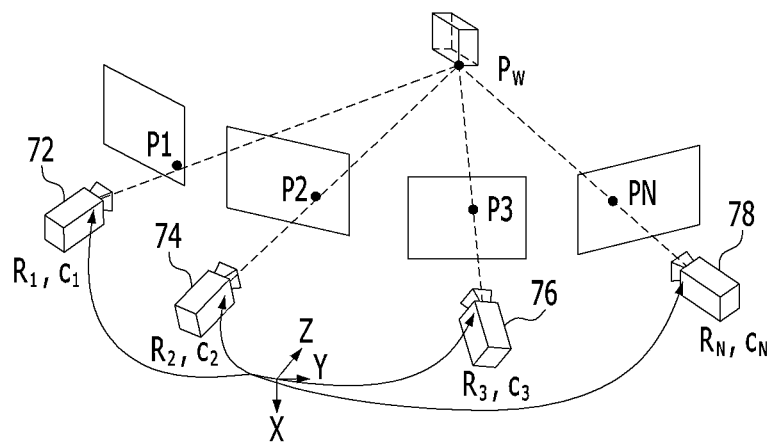
FIG. 5 illustrates a plurality of camera devices according to an embodiment of the present disclosure.

FIG. 5 illustrates a plurality of camera devices according to an embodiment of the present disclosure. According to an embodiment, a plurality of camera devices 72, 74, 76, 78 can generate a multi-view image described with reference to FIG. 1. Each of the camera devices 72, 74, 76, 78 can generate a 2D image. For example, a group of these 2D images obtained at the same time or a substantially same time from the camera devices 72, 74, 76, 78 is included in the multi-view image.

Referring to FIG. 5, a subject or an object exists in a three-dimensional (3D) space. An arbitrary point $P_W$ can be captured at a specific pixel P1, P2, P3, PN by a plurality of camera devices 72, 74, 76, 78. The first camera device 72 can be located at a first position $C_1$ on the three-dimensional (3D) space (X, Y, Z dimensions). The arbitrary point $P_W$ can be connected via a first ray $R_1$ to the first position $C_1$ of the first camera device 72. The first ray $R_1$ can pass through the first pixel P1. The second camera device 74 can be located at a second position $C_2$ on the three-dimensional (3D) space. The arbitrary point $P_W$ can be coupled via a second ray $R_2$ to the second position $C_2$ of the second camera device 74. The second ray $R_2$ can pass through the second pixel P2. The third camera device 76 can be located at a third position $C_3$ on the three-dimensional space. The arbitrary point $P_W$ can be connected via a third ray $R_3$ to the third position $C_3$ of the third camera device 76. The third ray $R_3$ can pass through the third pixel P3. The fourth camera device 78 can located at a fourth position $C_4$ on the three-dimensional space, and the arbitrary point $P_W$ can be coupled via a fourth ray $R_4$ to the fourth position $C_4$ of the second camera device 78. The fourth ray $R_4$ can pass through the fourth pixel P4.

According to an embodiment, the first to fourth positions $C_1$, $C_2$, $C_3$, $C_4$ of the plurality of camera devices 72, 74, 76, 78 in FIG. 5 can be defined and recognized from a reference position or an absolute position in a three-dimensional space coordinate (X, Y, Z-axis). In another embodiment, relative locations or relative positions between the plurality of camera devices 72, 74, 76, 78 can be recognized without the reference position. As described with reference to FIG. 1, when the plurality of camera devices 72, 74, 76, 78 can be arranged on a same horizontal line, the absolute or relative positions of the plurality of camera devices 72, 74, 76, 78 might be simply recognized or defined.

Figure 6:
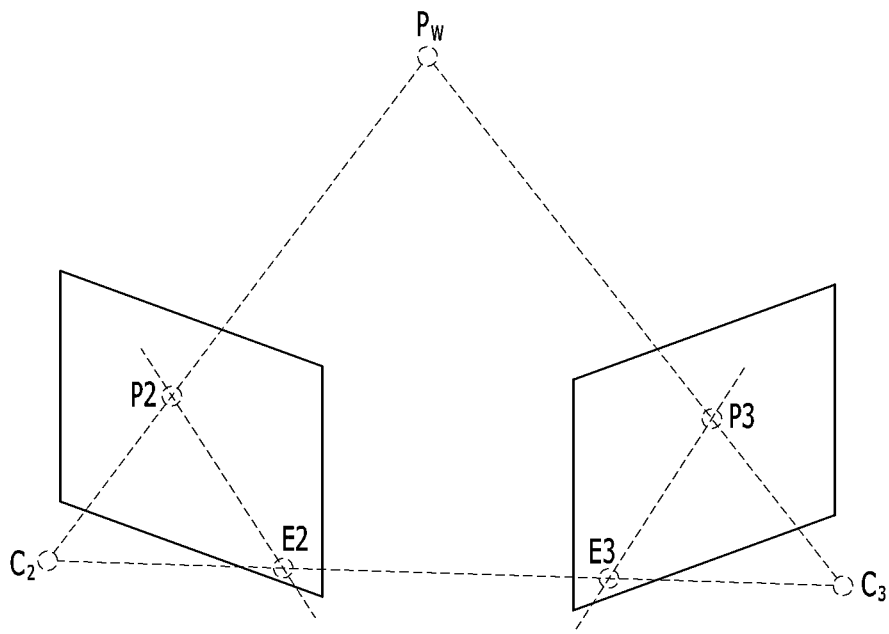
FIG. 6 illustrates an epi-polar geometry or an iso-polar geometry according to an embodiment of the present disclosure.

FIG. 6 illustrates an epi-polar geometry or an iso-polar geometry according to an embodiment of the present disclosure. Specifically, the second camera device 74 and the third camera device 76 among the plurality of camera devices 72, 74, 76, described with reference to FIG. 5 are described as examples.

Referring to FIG. 6, the second camera device 74 can be located at the second position $C_2$, and the third camera device 76 can be located at the third position $C_3$. Here, the second position $C_2$ and the third position $C_3$ can be understood as a center of projection of each camera device 74, 76. The second camera device 74 and the third camera device 76 can individually capture a two-dimensional image, e.g., a plane image.

For example, an arbitrary point $P_W$ in the three-dimensional space can be captured on the second pixel P2 of the image by the second camera device 74 and on the third pixel P3 on the image of the third camera device 76. Points or pixels where each of two images and a line connecting the second position $C_2$ of the second camera device 74 and the third position $C_3$ of the third camera device 76 are intersected with each other, can be called second and third epi-poles E2, E3. A line connecting the second and third epi-poles E2, E3 to the second pixel P2 and the third pixel P3 on each of the two images can be referred to as a first epi-polar line. Herein, an epi-polar line is the straight line of intersection of the epi-polar plane with the image plane. That is, a straight line connecting the second pixel P2 and the second epi-pole E2 can be referred to as a second epi-polar line, and a straight line connecting the third pixel P3 and the third epi-pole E3 can be referred to as a third epi-polar line. Further, there is a constraint according to the geometric relationship between planes of the two images, which means that all points of one image can be located on an epi-polar line in another image. This can be called an epi-polar constraint. In addition, a plane determined by the arbitrary point $P_W$, the second position $C_2$, and the third position $C_3$ can be referred to as an epi-polar plane.

Epi-polar constraints and noise are further described in detail. Herein, the absolute or relative positions of the second position $C_2$ and the third position $C_3$ are a type of information recognized by the image processing system. The second camera device 74 can know the position of the second pixel P2 in the acquired image plane. In this case, in order to accurately know the position of the third pixel P3 on the image plane acquired by the third camera device 76, a distance from the second position $C_2$ to the arbitrary point $P_W$ is necessary. However, because there is the epi-polar plane determined by the arbitrary point PW and the second position $C_2$ and the third position $C_3$, it can be estimated that the third pixel P3 is located on the third epi-polar line even if there is no information regarding the distance from the second position $C_2$ to the arbitrary point $P_W$. However, pixels corresponding to an arbitrary point PW in the multi-view image might not be located on the epi-polar line. These pixels can be considered a noise in the multi-view image.

Figure 7:
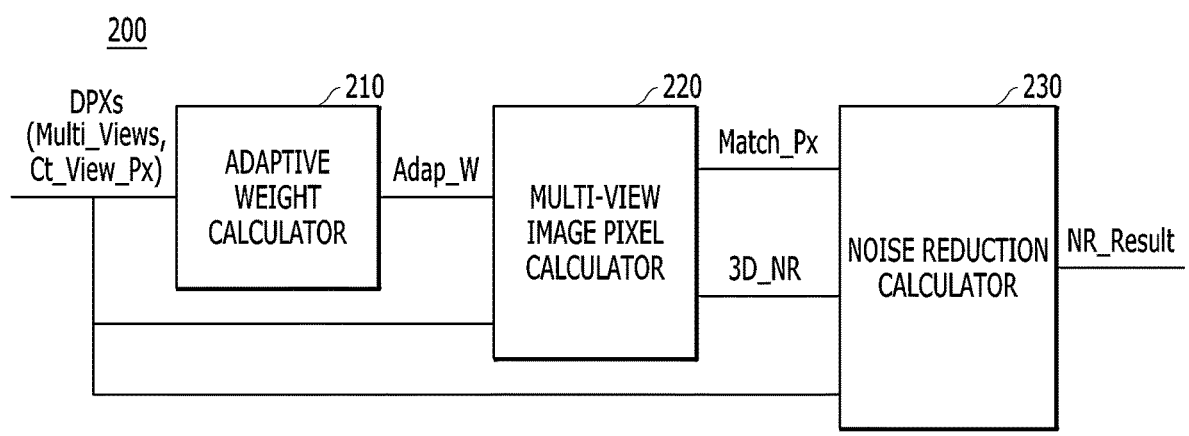
FIG. 7 illustrates an image processor according to another embodiment of the present disclosure.

FIG. 7 illustrates an image processor according to another embodiment of the present disclosure.

Referring to FIG. 7, the image processor 200 can include an adaptive weight calculator 210, a multi-view image pixel calculator 220, and a noise reduction calculator 230. The adaptive weight calculator 210 can receive a center-view image Ct_View_Px as input and calculate an adaptive weight Adap_W. The multi-view image pixel calculator 220 can be configured to determine substitutable pixel information to reduce a noise in an epi-polar image. The noise reduction calculator 230 can output a noise reduction result NR_Result based on the pixel information Match_Px determined by the multi-view image pixel calculator 220 and the adaptive weight Adap_W. The image processor 200 can receive a plurality of pixel values DPXs from the image sensor 100 described with reference to FIGS. 1 to 3 or the plurality of camera devices 72, 74, 76, 78 described with reference to FIG. 5. As described with reference to FIG. 1, the plurality of pixel values DPXs can include a multi-view image Multi_Views. Herein, the multi-view image Multi_Views is configured by a group of two-dimensional (2D) images obtained at the same time from respective camera devices or respective micro-lenses of 3-dimensionally arranged locations (e.g., see FIG. 5). The multi-view image Multi-Views can include a center-view image Ct_View_Px which is obtained from a centrally located one among the camera devices or the micro-lenses.

Herein, a view can be considered a feature of data when each image is recognized in the form of a matrix of numbers in the image processor 200 where these numbers are known as pixel data. For example, data of the multi-view image can have various other characteristics such as voice or text existing in the data or various characteristics of data obtained from various sources. Further, the multi-view image can include two-dimensional images obtained by capturing a subject or an object located in a three-dimensional space at different positions, e.g., positions where image capturing devices are located. When a same subject is photographed at different positions, each of the two-dimensional images include different information regarding the same subject.

The image processor 200 can receive the multi-view image obtained from the plurality of camera devices. The image processor 200 can divide a flat region and a non-flat region of the multi-view image based on the center-view image included in the multi-view image. Referring to FIGS. 1 and 5 to 6, the image processor 200 can generate an epi-polar image from the received multi-view image. When noise occurred in the flat region and the non-flat region is checked through the epi-polar image, an amount of the noise might not have a significantly different deviation between the flat region and the non-flat region. However, a noise appearing in the flat region can generally have a greater visual impact on a user who sees an image.

The image processor 200 according to an embodiment of the present disclosure can reduce noise occurring in the flat region and the non-flat region in different ways, after dividing the flat region and the non-flat region in a multi-view image. For example, in the flat region, the epi-polar line is replaced with a pixel average value of the multi-view image to reduce the noise. In the non-flat region, the epi-polar line is replaced with the pixel value of the center-view image obtained from a centrally located camera device among the plurality of camera devices.

Also, according to an embodiment, the noise reduction result NR_Result output from the image processor 200 can be different according to the adaptive weight Adap_W differently applied to the flat region and the non-flat region. Detailed operations and configurations of the adaptive weight calculator 210, the multi-view image pixel calculator 220, and the noise reduction calculator 230 included in the image processor 200 will be described with reference to FIGS. 8 to 17.

Figure 8:
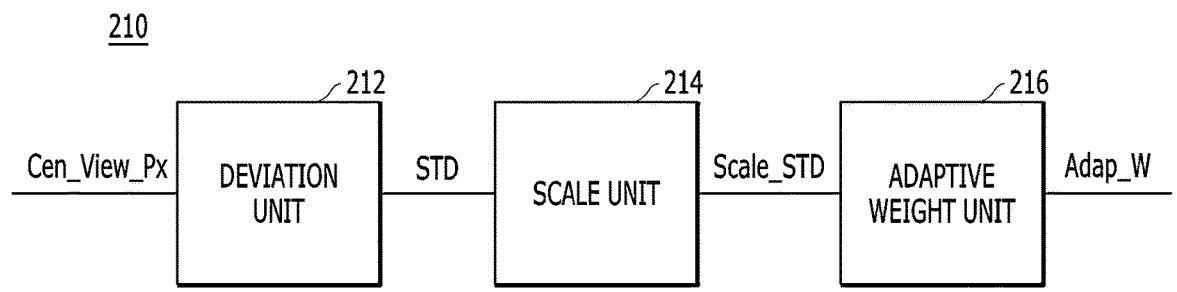
FIG. 8 illustrates an adaptive weight calculator described in FIG. 7 according to an embodiment of the present disclosure.

FIG. 8 illustrates an adaptive weight calculator described in FIG. 7 according to an embodiment of the present disclosure.

Referring to FIG. 8, the adaptive weight calculator 210 can include a deviation unit 212, a scale unit 214, and an adaptive weight unit 216. The adaptive weight calculator 210 can determine an adaptive weight from the multi-view image.

The deviation unit 212 may calculate a standard deviation STD by using pixel values of the center-view image among the multi-view image. Here, the center-view image Ct_View_Px can include an image obtained from a centrally located camera device among a plurality of camera devices generating a multi-view image. For example, the standard deviation STD can be extracted from the center-view image through a 5×5 kernel. Here, the kernel can mean a square matrix. Five by five pixels (total of 25 pixels) in the horizontal and vertical directions can be considered a single kernel. Movement of kernels can cause a change in image values (image data) of the kernel. When the standard deviation STD for the change in the image values of the kernel is determined, a flat region and a non-flat region in the center-view image Ct_View_Px can be distinguished. According to an embodiment, the deviation unit 212 can select and use any image of the multi-view image to distinguish the flat region and the non-flat region of the multi-view image.

Here, the non-flat region can include an uneven region as well as an edge region. According to an embodiment, as the standard deviation STD is larger, the kernel can be determined as a non-flat region. The kernel can be determined as a flat region, as the standard deviation STD is smaller. Rather than absolutely distinguishing the flat region and the non-flat region based on a specific value or a reference, the flat region and the non-flat region can be relatively distinguished from each other in the multi-view image. For example, a deviation value dividing the flat region and the non-flat region might vary for each multi-view image.

The scale unit 214 can generate a scaled standard deviation Scale_STD by applying a scale to the standard deviation STD calculated by the deviation unit 212. Pixel data included in the multi-view image or the center-view image can include various variables. This is because, for example, the plurality of camera devices does not capture a same subject having a same shape, color, or distance, and all pixel data in images captured by the plurality of camera devices are not the same. Accordingly, when scales between various variables included in the pixel data are different, parameter distortion can occur in a modeling based on different scales. Accordingly, the scale unit 214 can calculate the scaled standard deviation Scale_STD by performing scaling or scale standardization. The difference between the scaled standard deviation Scale_STD and the standard deviation STD will be described later with reference to FIG. 9.

The adaptive weight unit 216 can determine the adaptive weight Adap_W corresponding to the scaled standard deviation Scale_STD. Here, the adaptive weight Adap_W can be changed according to the scaled standard deviation Scale_STD, which will be described later with reference to FIG. 10. Rather than applying a uniform weight regardless of the information contained in the multi-view image, the adaptive weight Adap_W which can adjust a weight based on the information contained in the multi-view image can have an advantage in reducing noise.

Figure 9:
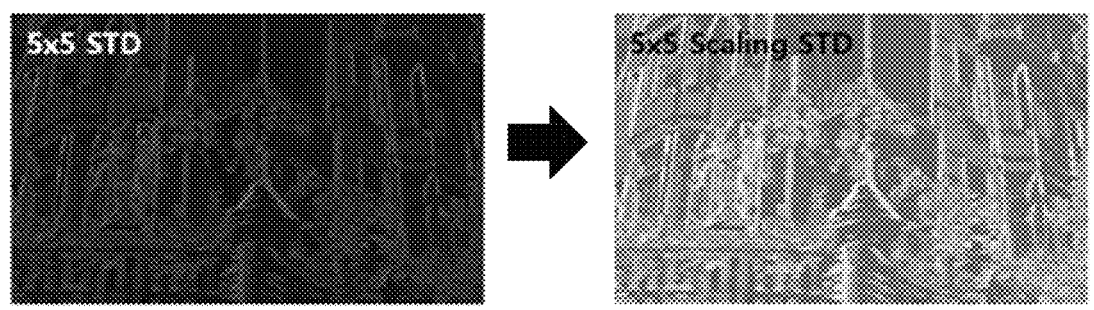
FIG. 9 illustrates a difference between a first image to which a standard deviation is applied and a second image to which a scaled standard deviation is applied according to an embodiment of the present disclosure.

FIG. 9 illustrates a difference between a first image to which a standard deviation is applied and a second image to which a scaled standard deviation is applied.

Referring to FIGS. 7 and 9, pixel data included in the multi-view image can include various variables. For example, variables such as a distance to the subject, a shape or color of the subject, and an illuminance around the subject exist in an image acquired by a single camera device. There are more variables in the multi-view image obtained from the plurality of camera devices. Accordingly, using the scaled standard deviation Scale_STD, which is calculated by applying scaling or scale standardization on the standard deviation STD through the scale unit 214 described in FIG. 7, can have an advantage in reducing noise.

Figure 10:
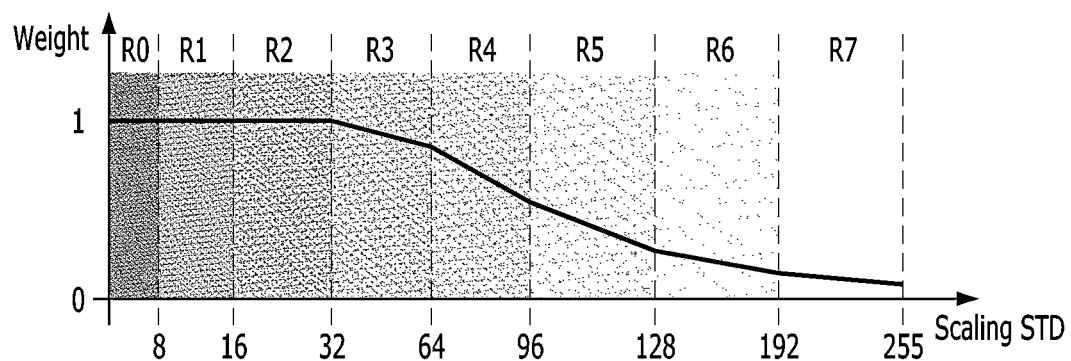
FIG. 10 illustrates a range of adaptive weights based on the scaled standard deviation according to an embodiment of the present disclosure.

FIG. 10 illustrates a range of adaptive weights based on the scaled standard deviation according to an embodiment of the present disclosure.

Referring to FIG. 10, the adaptive weight Adap_W can vary according to the scaled standard deviation Scale_STD. According to an embodiment, the scaled standard deviation Scale_STD can have one of values from 0 to 255 as 8-bit information R0 to R7. The adaptive weight Adap_W can have a value between 0 and 1. As the scaled standard deviation Scale_STD increases, the adaptive weight Adap_W can decrease.

The adaptive weight Adap_W can be input to the noise reduction unit 230 described in FIG. 7. The adaptive weight Adap_W can be used as a parameter to determine whether to increase a weight of the noise reduction result NR_Result or a weight of the pixel value, to derive adaptive processing results in flat and non-flat regions of the multi-view image.

Figure 11:
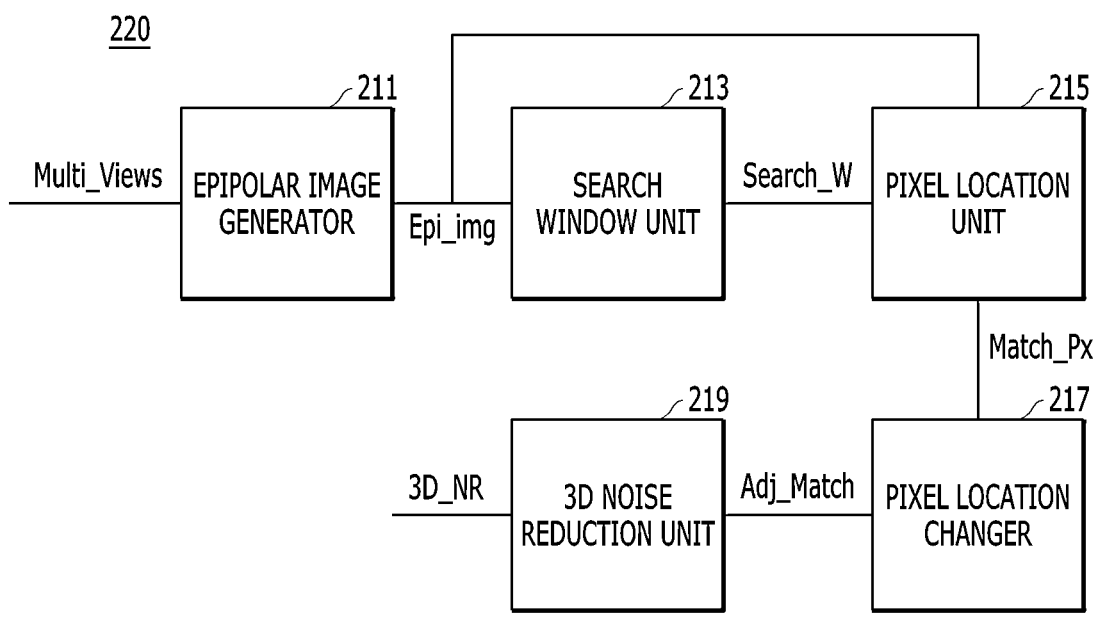
FIG. 11 illustrates a multi-view image pixel calculator described with reference to FIG. 7 according to an embodiment of the present disclosure.

FIG. 11 illustrates a multi-view image pixel calculator described with reference to FIG. 7 according to an embodiment of the present disclosure.

Referring to FIG. 11, the multi-view image pixel calculator 220 can include an epi-polar image generator 211, a search window unit 213, a pixel location unit 215, a pixel location changer 217, and a 3D noise reduction unit 219.

The epi-polar image generator 211 can receive the multi-view image Multi_Views and generate an epi-polar image Epi_img. According to an embodiment, the multi-view image Multi_Views can be received from a plurality of camera devices. The plurality of camera devices can have a difference in a horizontal position. For example, the multi-view image Multi_Views can include plural images which are obtained by photographing a same subject by the plurality of camera devices arranged in the horizontal direction. The epi-polar geometry has been described with reference to FIGS. 5 and 6. An epi-polar image Epi_img generated based on the multi-view image Multi_Views is described later with reference to FIG. 12.

The search window unit 213 can recognize that an epi-polar line corresponds to the object, e.g., the arbitrary point $P_W$ of the subject described in FIG. 5., The search window unit 213 can consider the farthest epi-polar line (e.g., the epi-polar line corresponding to the farthest object) in the epi-polar image Epi_img generated by the epi-polar image generator 211 as a vertical line. When a slope of another epi-polar line corresponding to the closest object in the epi-polar image Epi_img has an X degree with respect to the vertical line, a range between the two epi-polar lines can be determined as a search window Search_W. According to an embodiment, the search window Search_W can be understood as a range of replaceable pixel values used in an operation for reducing noise in the epi-polar image Epi_img, which will be described in detail with reference to FIGS. 15 and 16.

The pixel location unit 215 can receive the search window Search_W of the epi-polar image Epi_img. The pixel location unit 215 can extract location information of pixels Match_Px having a most similar value to a reference pixel within the search window Search_W. For example, the pixel position unit 215 can select a pixel Match_Px among adjacent pixels in the epi-polar image Epi_img, the pixel Match_PX having a minimum difference in intensity. Through this method, the pixel position unit 215 can search for a pixel position in another image, which can correspond to a pixel in the center view image or a reference view image. In this case, the pixel position unit 215 can find a pixel in the epi-polar image Epi_img, the pixel having a minimum difference in the intensity based on a patch corresponding to a preset ratio of 1×N within the search window.

The pixel position changer 217 can replace an epi-polar line, including a pixel of the center view image or the reference view image, with a new epi-polar line inferred from the location information Match_Px extracted among the pixels within the epi-polar image Epi_img by the pixel position unit 215. The distribution of data in the epi-polar image may vary due to factors such as noise or occlusion. For example, outliers outside the normal distribution can be removed, or the outliers could be adjusted through data approximation such as outlier rejection fitting. According to an embodiment, the pixel position changer 217 can infer a new epi-polar line based on the pixels extracted by the pixel position unit 215 through a RANdom SAmple Consensus (RANSAC) algorithm. Here, the RANSAC algorithm can include a procedural method for selecting a model with a maximum consensus as described above. For example, a model parameter that satisfies these sample data is obtained by randomly selecting some sample data. The pixel position changer 217 can count the number of data close to the model obtained in this way. If a counted number of a model is large, the pixel position changer 217 stores that model. After repeating this process N times, a model with the largest number of supported data can be returned as a final result. Thereafter, the pixel position changer 217 can replace a position of the existing pixel with a position of the pixel on the new, i.e., inferred, epi-polar line.

The 3D noise reduction unit 219 can determine a 3D noise reduction value 3D_NR capable of replacing pixels in a flat region of the center-view image. For example, the 3D noise reduction unit 219 can output a 3D noise reduction value 3D_NR by averaging pixel data corresponding to a pixel by the pixel position changer 217.

According to an embodiment, the multi-view image pixel calculator 220 can generate the three-dimensional noise reduction value 3D_NR capable of reducing noise in a flat region of the multi-view image Multi_Views. However, in the non-flat region of the multi-view image Multi_Views, after finding the position where the difference in intensity is the minimum, based on the position, a new epi-polar line is used with the RANSAC (RANdom SAmple Consensus) algorithm. In the process of inferring a new epi-polar line, an amount of computation or calculation can increase, or reliability of the result can be lowered. For a fast image processing in a non-flat region of the multi-view image Multi_Views, in an embodiment of the present disclosure, a pixel value in a center-view image can be used for replacement instead of a three-dimensional noise reduction value 3D_NR.

Figure 12:
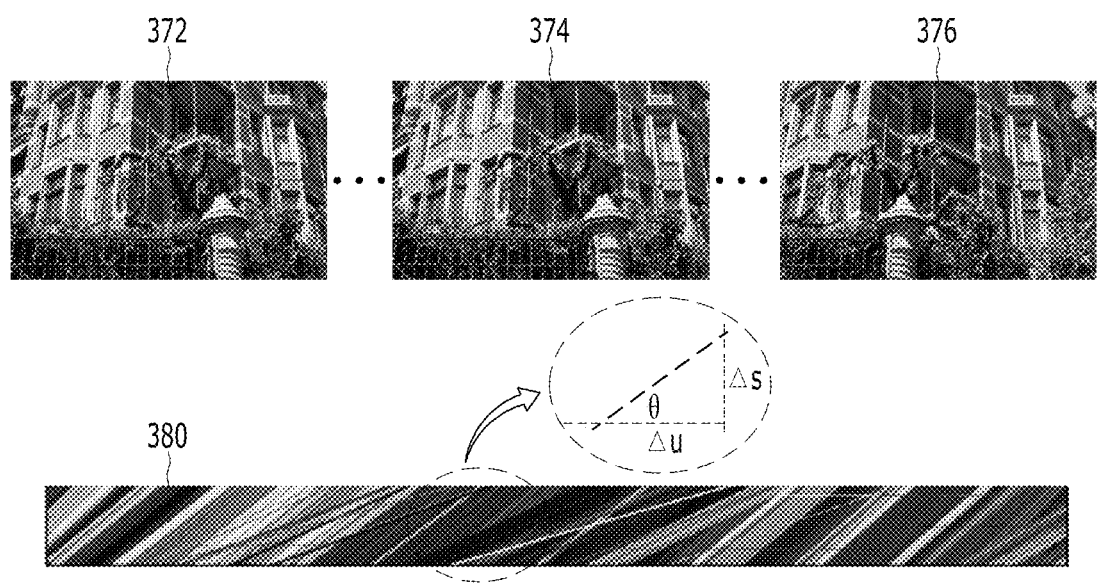
FIG. 12 illustrates an epi-polar image generated based on a multi-view image according to an embodiment of the present disclosure.

FIG. 12 illustrates an epi-polar image generated based on a multi-view image according to an embodiment of the present disclosure.

Referring to FIG. 12, an epi-polar image 380 can be generated based on the multi-view image including 2D images 372, 374, 376 obtained from a plurality of camera devices. The multi-view image 372, 374, 376 can include a first image 372 obtained from a first camera device disposed at the leftmost side, and a center-view image 374 obtained from a camera device disposed at the center among a plurality of camera devices, and a second image 376 obtained from the Nth camera device disposed at the rightmost side. As described in FIG. 5, the plurality of cameras may be disposed at locations which could be recognized by relative or absolute positions as a three-dimensional coordinate value. However, when the plurality of cameras is horizontally and evenly separated from each other, image rectification could be simplified.

For example, the epi-polar image 380 can be generated by collecting pixel data corresponding to a same row in the multi-view image 372, 374, 376 and stacking data from bottom to top based on a time. Generating the epi-polar image 380 from the multi-view image 372, 374, 376 is well-known and will not be described in detail in this disclosure. An epi-polar line in the epi-polar image 380 can have a slope $\theta$ of $\Delta S/\Delta U$. Here, $\Delta S$ can be a geometric distance between two cameras, and $\Delta U$ can be a distance between points in the respective images acquired from the two cameras, e.g., the points corresponding to the arbitrary point $P_W$ (see FIGS. 5 and 6). The depth or distance of the subject in the multi-view image 372, 374, 376 can be inversely proportional to the slope $\theta$ of the epi-polar line.

Figure 13:
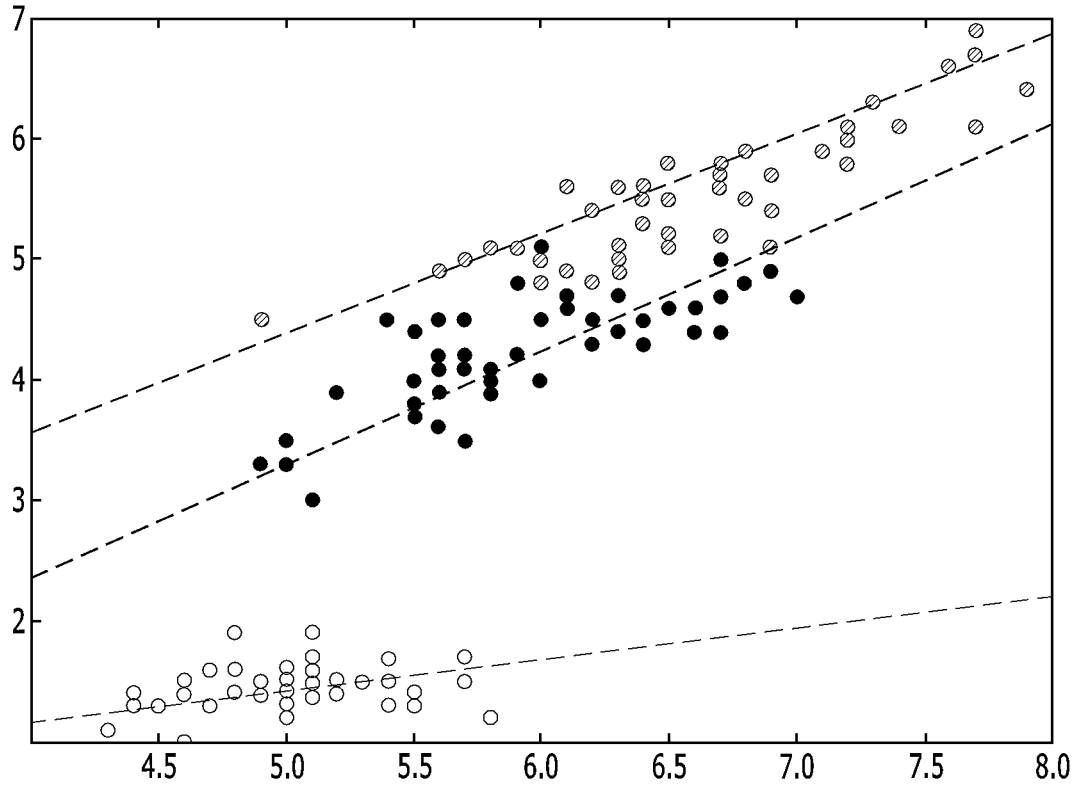
FIG. 13 illustrates a noise included in an epi-polar image according to an embodiment of the present disclosure.

FIG. 13 illustrates a noise included in an epi-polar image according to an embodiment of the present disclosure. Generally, in an epi-polar image, the relationship between the horizontal axis x in image and its depth (y-axis) is linear if a scene is a flat region, like three dotted lines in FIG. 13.

Referring to FIG. 13, position distribution regarding the actual pixels of the epi-polar image might not exactly match the epi-polar line, i.e., the three dotted lines. Referring to FIGS. 5 to 6 and 12, a positional relationship between the plurality of camera devices can be clearly recognized. When there is no noise in the image obtained from each camera device, and when an epi-polar image is generated based on the multi-view image, all pixels can be located on the epi-polar line because there is no noise. However, when an epi-polar image is generated based on a multi-view image obtained through the plurality of camera devices, many pixel values can exist out of the epi-polar line. Accordingly, the image processor 200 or the image processor 200 described in FIGS. 1 and 7 could try to reduce such noise. If an epi-polar line is generated through noise reduction, the subject depth or distance could be more accurately estimated based on the slope of the epi-polar line.

On the other hand, a process of detecting and processing occlusions or occluded regions can be additionally performed to improve the accuracy of depth information as well as to remove noise by using the epi-polar constraint from the epi-polar image. For example, detected occluded regions can be filled with a depth value calculated or determined in consideration of a distance and a color difference from pixels in a visible surrounding area.

Figure 14:
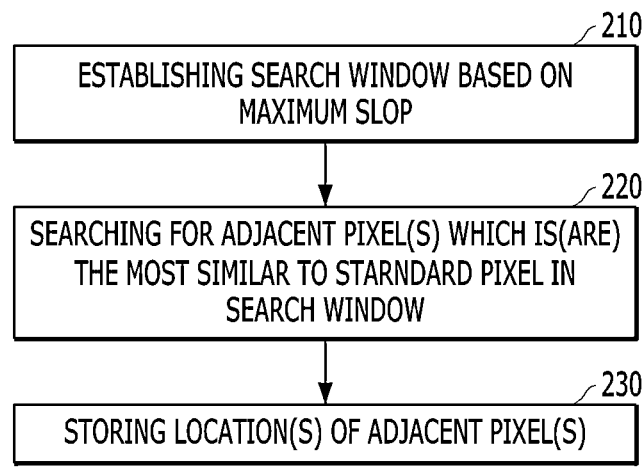
FIG. 14 illustrates a pixel determination method for reducing a noise included in an epi-polar image according to an embodiment of the present disclosure.

FIG. 14 illustrates a pixel determination method for reducing a noise included in an epi-polar image according to an embodiment of the present disclosure.

Referring to FIG. 14, the pixel determination method for reducing the noise can include establishing a search window based on a maximum slope line in an epi-polar image (operation 210), searching for adjacent pixel(s), which is/are the most similar to a standard pixel or a reference pixel, in the search window (operation 220), and storing location(s) of the adjacent pixel(s) (operation 230).

For noise reduction, it is important to reduce or remove noise while keeping or maintaining characteristics of each pixel information output by the image sensor 100. In a process of reducing or removing noise having information or values different from adjacent pixels, an image in which a texture is lost can be felt artificially by a user when the characteristics of each pixel information output from the image sensor 100 is not maintained. However, in the process of removing a larger amount or ratio of noise, each pixel information or information output from the image sensor 100 might become dull or flat. An image processor can reduce noise by using an average value and a mean value of adjacent pixels in an image. For example, in a linear smoothing filter, a method of obtaining an average or weighted average of pixel values, around noise, including the noise pixel and replacing data of the noise pixel with an operation result has been used. In a non-linear averaging filter, a method of specifying a noise pixel, finding a median value of pixel values around the noise, and replacing data of the noise pixel with the median value has been used.

Referring to FIGS. 12 to 14, after generating an epi-polar image from a multi-view image, the image processor can establish a search window based on a slope of an epi-polar line in the epi-polar image. The most similar neighboring pixels in the search window are found by the image processor. The image processor can replace noise pixels with values obtained from the similar neighboring pixels. In an embodiment of the present disclosure, the average value or the mean value obtained from the neighboring pixel values around the noise pixel might not be simply used to reduce a noise. Accordingly, the embodiment can avoid that each pixel information output from the image sensor 100 becomes dull or flat.

Figure 15:
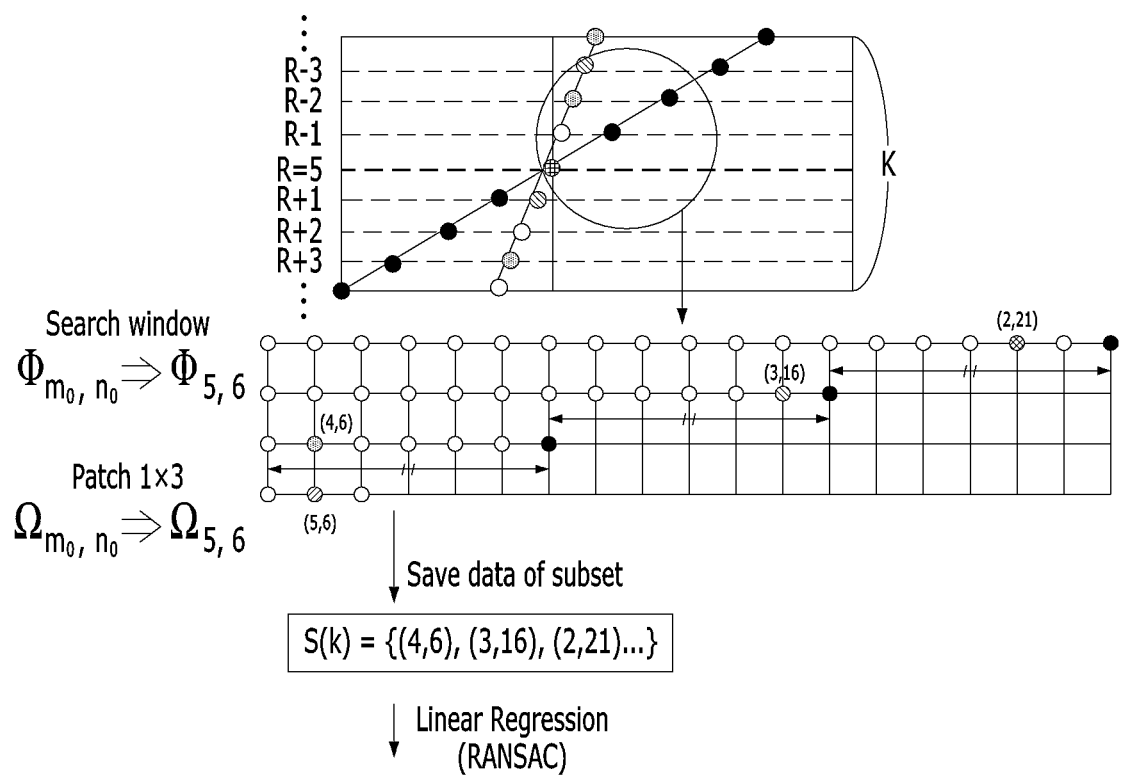
FIG. 15 illustrates an example of the pixel determination method described in FIG. 14 according to an embodiment of the present disclosure.

FIG. 15 illustrates an example of the pixel determination method described in FIG. 14 according to an embodiment of the present disclosure.

Referring to FIG. 15, how to determine a pixel for replacing a noise pixel in an epi-polar image generated based on a multi-view image is described. First, an epi-polar image can be generated by stacking K pieces of same row data from the multi-view image including K images collected from K camera devices, where 'K' is an integer greater than 2.

In row information (R=5) extracted from a 5th image, the image processing device can recognize two lines based on the positions of the nearest pixel and the furthest pixel in the adjacent row (R−1) from a vertical line. A region between two lines can be set as a search window. If a pixel having the most similar value to a reference pixel at a position of (5, 6) in the row information (R=5) extracted from the 5th image is found in the row information (R−1) extracted from the 4th image, a position of (4, 6) could be determined. Next, if it is found in the row information (R−2) extracted from the third image, a position of (3, 16) could be determined. Next, if it is found in the row information (R−3) extracted from the second image, a position of (2, 21) could be determined. The image processor can sequentially store location information of pixels S(k) extracted from each image. Then, the image processor can estimate a new epi-polar line through the RANdom SAmple Consensus (RANSAC) algorithm based on the position information of the pixels found in the search window.

Figure 16:
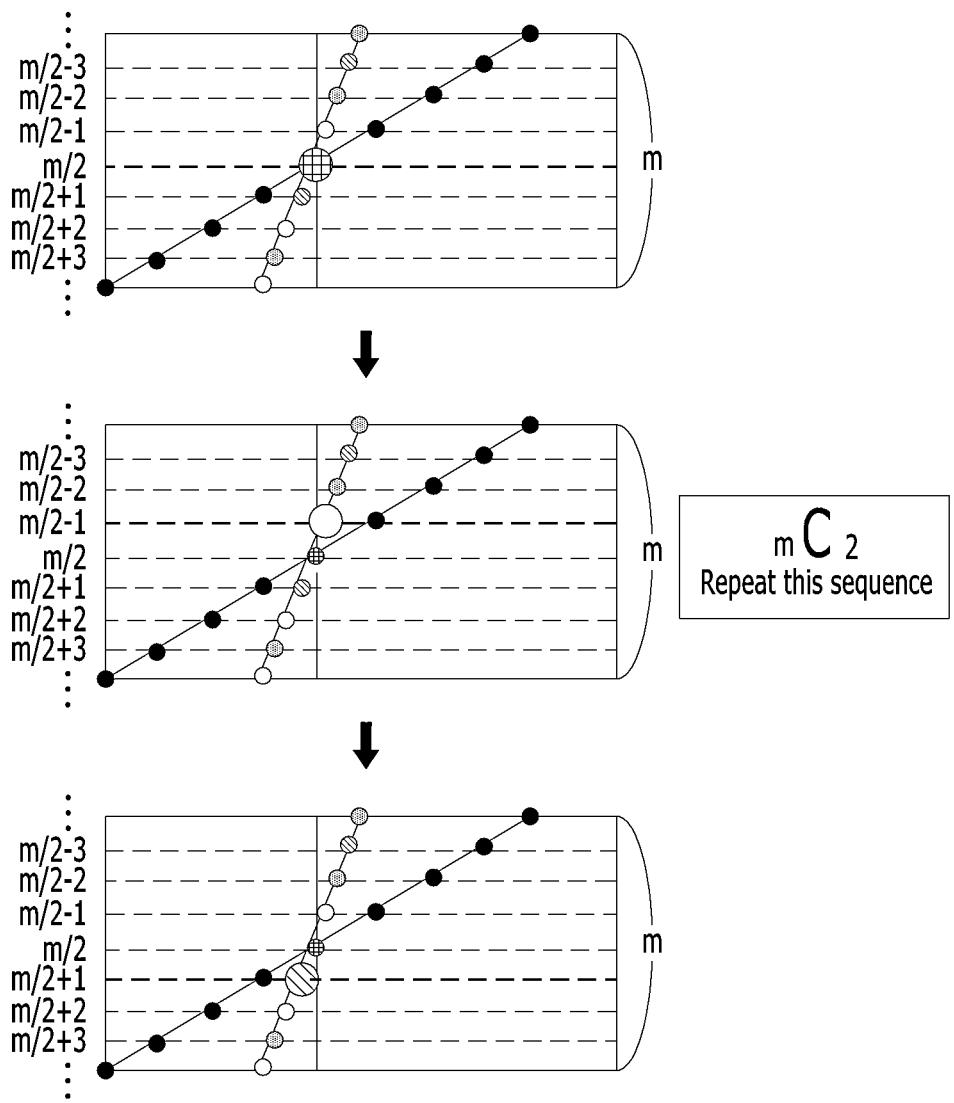
FIG. 16 illustrates a result of noise reduction in an epi-polar image according to an embodiment of the present disclosure.

FIG. 16 illustrates a result of noise reduction in an epi-polar image according to an embodiment of the present disclosure.

Referring to FIG. 16, the image processing device can generate an epi-polar image based on a multi-view image collected and obtained from m number of camera devices, find a replaceable pixel in the epi-polar image, and estimate a new epi-polar line having the most similar value to the reference pixel as described in FIG. 15. This procedure can be repeatedly performed. According to an embodiment, the reference pixel is a pixel information extracted from a center-view image collected by an m/2-th camera device located at a central position among the m number of camera devices. Based on the pixel information extracted from the center-view image obtained from the m/2th camera device, the image processing device can search for the most similar pixel among pixel information collected from the m/2−1, m/2−2, and m/2−3th camera devices in a specific direction, and search for the most similar pixel among pixel information collected from the m/2+1, m/2+2, and m/2+3th camera devices in the opposite direction.

When a new epi-polar line is calculated based on the pixel information found in the above-described method, a texture of the image could be effectively kept or maintained while the noise generated or generated for various reasons is reduced in a process of generating a 3D image based on the multi-view image. In an embodiment of the present disclosure, such an image processing method can be applicable to a flat region in the multi-view image.

Figure 17:
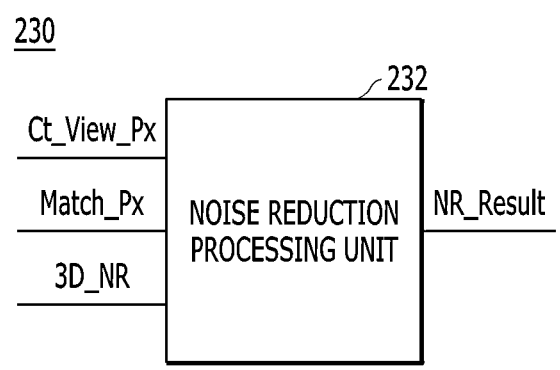
FIG. 17 describes a noise reduction calculator described in FIG. 7 according to an embodiment of the present disclosure.

FIG. 17 describes a noise reduction calculator described in FIG. 7 according to an embodiment of the present disclosure.

Referring to FIG. 17, the noise reduction calculator 230 can include a noise reduction processing unit 232. The noise reduction calculator 230 can remove or reduce noise from the center-view image of the multi-view image. The noise reduction processing unit 232 can receive the center-view image Ct_View_Px, the position information Match_Px output from the pixel location unit 215, and the 3D noise reduction value 3D_NR output from the 3D noise reduction unit 219 and output a noise-reduced replaceable value NR_Result. For example, in the flat region of the image, the 3D noise reduction value 3D_NR output from the 3D noise reduction unit 219 can be multiplied by the adaptive weight Adap_W output from the adaptive weight calculator 210. Here, the adaptive weight Adap_W can be a value greater than 0 and less than 1. Moreover, in the non-flat region of the image, the pixel value of the center-view image Ct_View_Px can be multiplied by a threshold value of the adaptive weight (1−Adap_W). Accordingly, the noise reduction operation unit 232 can output the noise reduction result NR_Result for reducing noise in the flat region and the non-flat region.

As above described, an image processor according to an embodiment of the present disclosure can reduce a noise in a 3D image obtained based on a multi-view image.

In addition, an apparatus according to an embodiment of the present disclosure can support a faster image processing by classifying the 3D image obtained based on the multi-view image into a flat region and a non-flat region and processing image data or pixel data in the flat region and the non-flat region of the 3D image in different ways, thereby reducing the amount of calculation or computation in the non-flat region of the 3D image.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods or operations of the computer, processor, controller, or other signal processing device, are described in detail, the code or instructions for implementing the operations of the method embodiments may transform the computer, processor, controller, or other signal processing device into a special-purpose processor for performing the methods herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments or operations of the apparatus embodiments herein.

The controllers, processors, control circuitry, devices, modules, units, multiplexers, generators, logic, interfaces, decoders, drivers, generators and other signal generating and signal processing features of the embodiments disclosed herein may be implemented, for example, in non-transitory logic that may include hardware, software, or both. When implemented at least partially in hardware, the controllers, processors, control circuitry, devices, modules, units, multiplexers, generators, logic, interfaces, decoders, drivers, generators and other signal generating and signal processing features may be, for example, any of a variety of integrated circuits including but not limited to an application-specific integrated circuit, a field-programmable gate array, a combination of logic gates, a system-on-chip, a microprocessor, or another type of processing or control circuit.

When implemented at least partially in software, the controllers, processors, control circuitry, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods or operations of the computer, processor, microprocessor, controller, or other signal processing device, are described in detail, the code or instructions for implementing the operations of the method embodiments may transform the computer, processor, controller, or other signal processing device into a special-purpose processor for performing the methods described herein.

While the present teachings have been illustrated and described with respect to the specific embodiments, it will be apparent to those skilled in the art in light of the present disclosure that various changes and modifications may be made without departing from the spirit and scope of the disclosure as defined in the following claims. Furthermore, the embodiments may be combined to form additional embodiments.

What is claimed is:

1. An image processing apparatus coupled to a plurality of image capturing devices collectively configured to generate a multi-view image and reduce a noise in an epi-polar image while generating a three-dimensional image from the multi-view image,
wherein the image processing apparatus is configured to:
divide the multi-view image into a flat region and a non-flat region,
generate the epi-polar image from the multi-view image,
replace an epi-polar line in the epi-polar image corresponding to the flat region with an average pixel value of the multi-view image, and
replace an epi-polar line in the epi-polar image corresponding to the non-flat region with a pixel value of a center-view image obtained from a centrally located image capturing device among the plurality of image capturing devices.

2. The image processing apparatus according to claim 1, wherein the flat region and the non-flat region are divided based on a standard deviation of an image selected from the multi-view image, and the non-flat region includes an edge region and an uneven region.

3. The image processing apparatus according to claim 1, wherein the image processing apparatus is configured to:
apply a gain and an offset to the standard deviation to generate a scaled standard deviation;
generate an adaptive weight based on the scaled standard deviation; and
apply the adaptive weight to the flat region and the non-flat region in different ways.

4. The image processing apparatus according to claim 3, wherein the adaptive weight tends to decrease as the scaled standard deviation increases.

5. The image processing apparatus according to claim 1, wherein the epi-polar image is generated by stacking pixel data corresponding to a same row of the multi-view image.

6. The image processing apparatus according to claim 5, wherein the image processing apparatus is configured to determine a search window between a first epi-polar line corresponding to the farthest object in the epi-polar image and a second epi-polar line corresponding to the closest object in the epi-polar image, or between a vertical reference line set by the first epi-polar line corresponding to the farthest object in the epi-polar image and another epi-polar line having a maximum slope in the epi-polar image.

7. The image processing apparatus according to claim 6, wherein the image processing apparatus is configured to extract a location of pixel having the least difference of intensity among plural pixels included in the search window.

8. The image processing apparatus according to claim 7, wherein the image processing apparatus is configured to estimate a new line using a RANdom SAmple Consensus (RANSAC) algorithm based on the location of the pixel and change the location of the pixel with a location of pixel on the new line.

9. The image processing apparatus according to claim 8, wherein the image processing apparatus is configured to calculate an average value from a pixel value at the location of pixel on the new line and apply an adaptive weight to the average value to reduce the noise.

10. The image processing apparatus according to claim 8, wherein the 3D image has a noise reduction result including: a first product of an adaptive weight and the average pixel value, the first product used for the flat region of the multi-view image; and a second product of a value obtained by subtracting the adaptive weight from 1 and the pixel value of the center-view image, the second product used for the non-flat region of the multi-view image.

11. A method for reducing noise while generating a three-dimensional image from a multi-view image, comprising:
receiving the multi-view image from a plurality of image capturing devices;
dividing a center-view image of the multi-view image into a flat region and a non-flat region;
generating an epi-polar image from the multi-view image;
replacing an epi-polar line in the epi-polar image corresponding to the flat region with an average pixel value of the multi-view image; and
replacing an epi-polar line in the epi-polar image corresponding to the non-flat region with a pixel value of the center-view image obtained from a centrally located image capturing device among the plurality of image capturing devices.

12. The method according to claim 11, wherein the flat region and the non-flat region are divided based on a standard deviation of the multi-view image, and the non-flat region includes an edge region and an uneven region.

13. The method according to claim 12, further comprising:
    applying a gain and an offset to the standard deviation to generate a scaled standard deviation;
    generating an adaptive weight based on the scaled standard deviation; and
    applying the adaptive weight to the flat region and the non-flat region in different ways.

14. The method according to claim 13, wherein the adaptive weight tends to decrease as the scaled standard deviation increases.

15. The method according to claim 11, wherein the epi-polar image is generated by stacking pixel data corresponding to a same row of the multi-view image.

16. The method according to claim 11, further comprising determining a search window between a first epi-polar line corresponding to the farthest object in the epi-polar image and a second epi-polar line corresponding to the closest object in the epi-polar image, or between a vertical reference line set by the first epi-polar line corresponding to the farthest object in the epi-polar image and another epi-polar line having a maximum slope in the epi-polar image.

17. The method according to claim 16, further comprising extracting a location of a pixel having the least difference of intensity among plural pixels included in the search window.

18. The method according to claim 17, further comprising estimating a new line using a RANdom SAmple Consensus (RANSAC) algorithm based on the location of the pixel and change the location of the pixel with a location of pixel on the new line.

19. The method according to claim 18, further comprising calculating an average value from a pixel value at the location of pixel on the new line and apply an adaptive weight to the average value to reduce the noise.

20. The method according to claim 18, wherein the 3D image has a noise reduction result including: a first product of an adaptive weight and the average pixel value, the first product used for the flat region of the multi-view image; and a second product of a value obtained by subtracting the adaptive weight from 1 and the pixel value of the center-view image, the second product used for the non-flat region.

21. An image processing method comprising:
    generating a multi-view image configured by a group of 2-dimensional (2D) images captured at respective three-dimensional (3D) locations different from each other, the 2D images being of the same object captured at the same time;
    generating an adaptive weight based on a statistical pixel value of a center-view image among the 2D images;
    generating an epi-polar image from the multi-view image;
    identifying a first epi-polar line within the epi-polar image;
    inferring a second epi-polar line within the center-view image based on the first epi-polar line;
    generating a 3D noise reduction value based on the second epi-polar line; and
    generating a noise-reduced replaceable value based on the center-view image, the first epi-polar line, the 3D noise reduction value and the adaptive weight.

\* \* \* \* \*